Oct. 12, 1965    H. W. FULLER    3,212,072
DIGITAL DELAY LINE
Filed Oct. 17, 1961    2 Sheets-Sheet 1
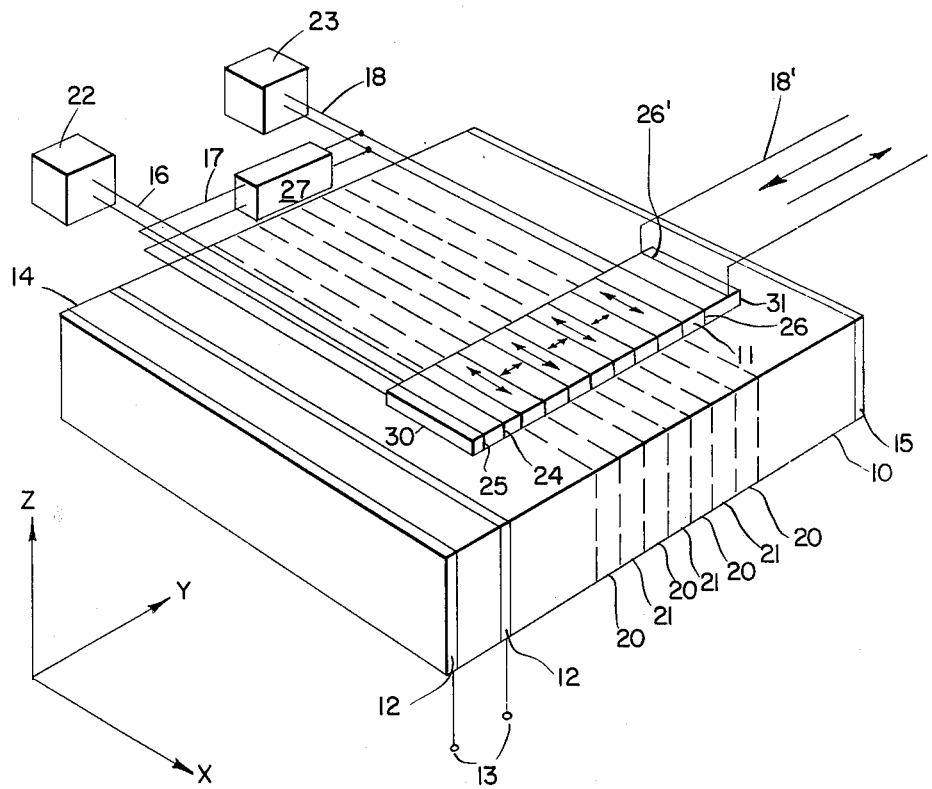
FIG.I
INVENTOR.
HARRISON W. FULLER
BY *E. MacKay Freser*
ATTORNEY Oct. 12, 1965  H. W. FULLER  3,212,072
DIGITAL DELAY LINE
Filed Oct. 17, 1961  2 Sheets-Sheet 2

INVENTOR.
HARRISON W. FULLER
BY E. MacCay Fraser
ATTORNEY

United States Patent Office 3,212,072
Patented Oct. 12, 1965

3,212,072
DIGITAL DELAY LINE
Harrison W. Fuller, Needham Heights, Mass., assignor to Laboratory For Electronics, Inc., Boston, Mass., a corporation of Delaware
Filed Oct. 17, 1961, Ser. No. 145,712
8 Claims. (Cl. 340—174)

This invention relates in general to new and improved delay lines and in particular to a digital delay line utilizing a magnetic film deposited onto an acoustic transmission medium.

In commonly used delay lines, signal energy is coupled through an input transducer to a solid acoustic transmission medium, and extracted through an output transducer at a point separated from the input by a delay path of predetermined length. The signal delay is equal to the time required for the ultrasonic energy to transverse the path between input and output transducer. However, large signal input power is required because of the attenuation encountered in the transducers in the interchange of electrical and acoustical energy and in the attenuation in the acoustic transmission medium itself. In addition considerable distortion is introduced in the input signal through the use of transducers and the dispersion of the acoustic transmission medium.

Accordingly it is the primary object of the present invention to provide a new and novel digital delay line requiring small signal input power.

It is another object of the present invention to provide a digital delay line introducing minimal distortion into the input signal.

It is a further object of the present invention to provide a digital delay line having no dispersion and high data density.

In the present invention a magnetic film is deposited onto an acoustic transmission medium which has a transducer bonded to one end and a matched absorber bonded to the other. An acoustic wave, induced in the acoustic transmission medium by the transducer, causes regions of tension and compression to exist on the surface of the acoustic transmission medium and hence in the magnetic film. Since a region of stress induces a uniaxial anisotropy in a magnetostrictive film, the regions of compression and tension cause the magnetic film to be divided into a sequence of regions in which the magnetization vectors are mutually perpendicular. These regions, or magnetic domains, propagate at acoustic velocities along with the acoustic wave. An input coil controls the orientation of the magnetization vectors in the propagating magnetic domains in accordance with the data to be placed in the magnetic film. The data is read out at any point along the magnetic film by an output coil or by magneto-optic techniques, and can be recirculated if desired.

These and other features of the invention together with further objects and advantages thereof will become apparent from the following detailed specification with reference to the acompanying drawings in which:

FIG. 1 illustrates the method of operation of a preferred embodiment of the present invention;

Figures 2A, 2B, 3:
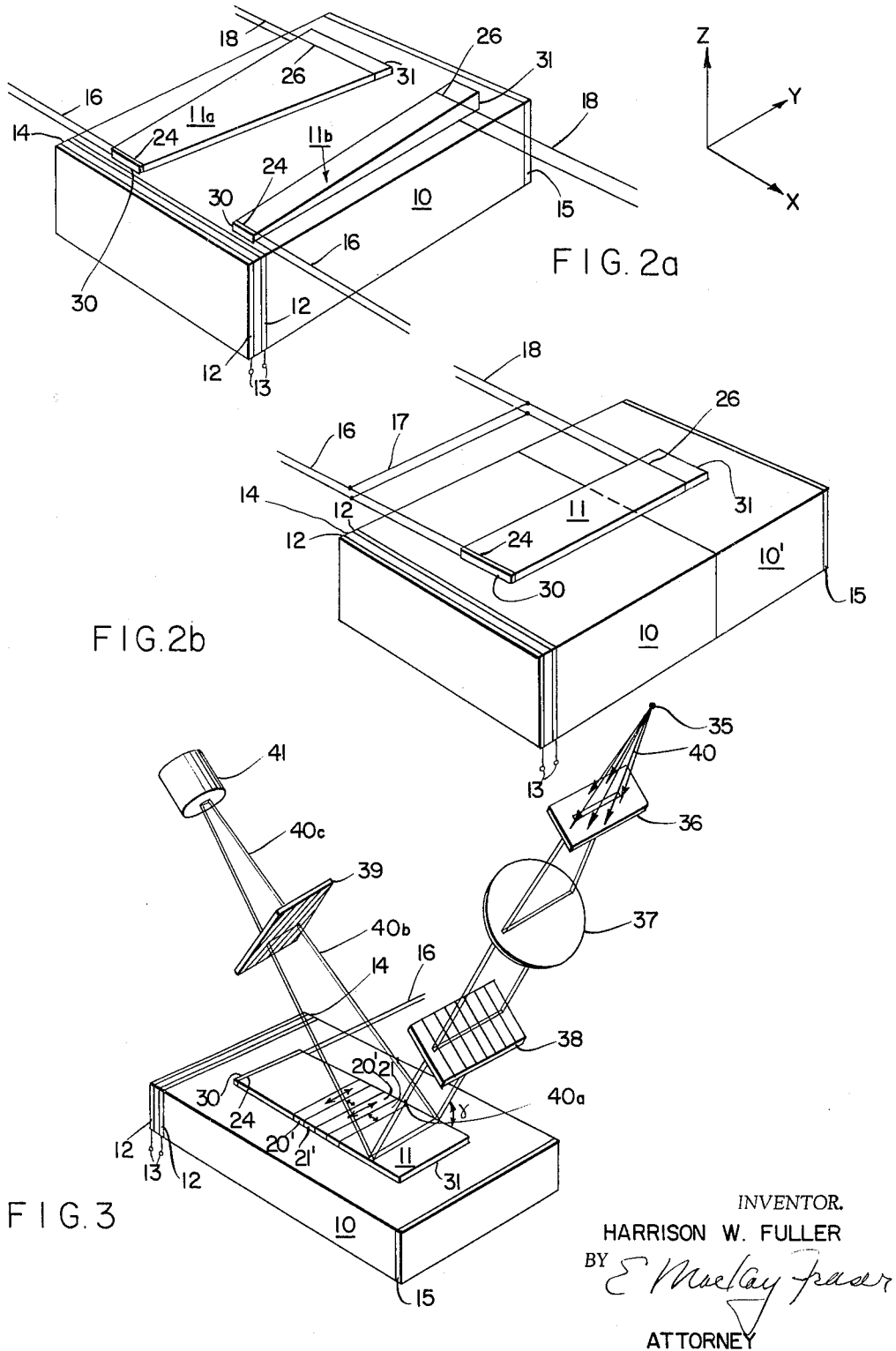
FIGS. 2a and 2b illustrate means for amplifying the output signal of the digital delay line.
FIG. 3 illustrates schematically the use of magnetooptic techniques in data readout.

In FIG. 1 a magnetic film 11 is shown deposited onto the surface of an acoustic transmission medium 10, such as, for example, a slab of quartz. Acoustic waves are created in the acoustic transmission medium 10 by a transducer 14, sandwiched between transducer electrodes 12 and activated by a voltage of the form $V_0 \sin wt$ (generated by any known means) appearing across terminals 13. The transducer may consist of a piezo-electric crystal such as $BaTiO_3$ and is bonded along with the transducer electrodes 12 to the acoustic transmission medium 10. The acoustic wave propagates in the "+Y" direction, creating regions of tension 21 and compression 20, and is absorbed at the end of the acoustic transmission medium 10 by a matched absorber 15. The regions of tension 21 and compression 20 in the acoustic transmission medium 10 create similar regions of tension and compression in the magnetic film 11.

Theoretically, if a stress is applied to a magnetic medium, the magnetic medium may acquire a stress-induced uniaxial anisotropy. The energy required to rotate the magnetization vectors of the magnetic medium out of the direction of stress is given by:

$$E\sigma = (3/2)\lambda_s \sigma \sin^2 \phi = A \sin^2 \phi$$

where $\lambda_s$ is the saturation magnetostriction coefficient of the magnetic medium and $\sigma$ is the amplitude of the stress. The variable A is taken as positive (when $\lambda_s > 0$) for a tensile stress. If the magnetic medium also has an easy direction of magnetization, i.e. a field-induced uniaxial anisotropy, the energy required to rotate the magnitization vectors of the magnetic medium out of athe easy direction of magnetization is given by:

$$E_m = (M_s H_k/2) \sin^2 \theta = K \sin^2 \theta$$

where $H_k$ is the magnetic field required to magnetically saturate the magnetic medium in the hard direction of magnetization (i.e. normal to the easy direction of magnetization) and $M_s$ is the saturation magnetization of the magnetic medium. K is a constant for any particular specimen. When the stress is applied along the easy direction of magnetization ($\phi = \theta$), a compressive stress of magnitude $A > K$ will cause the magnetization vectors to spontaneously rotate into the hard direction of magnetization; if the stress is normal to the easy direction of magnetization ($\phi = 90° - \theta$), a tensile stress of magnitude $A > K$ will likewise cause the magnetization vectors to spontaneously rotate into the hard direction of magnetization. Accordingly, if the magnetic medium is isotropic ($K = 0$), a tensle stress will orient the magnetization vectors of the magnetic medium parallel to the direction of stress, while a compressive stress will orient them normal to the direction of stress.

The magnetic film 11, because of the regions of compression and tension therein, is now composed of a sequence of magnetic domains which have their magnetization vectors mutually perpendicular and which propagate in the "+Y" direction at acoustic velocities. Data is read-in by an electrical current, generated by signal generator 22 and flowing through leads 16 and input coil 24 in the "±X" direction; such a current creates a magnetic field in the "±Y" direction, depending on the sense of the current, which causes the magnetization vectors of alternate magnetic domains to point in the "+Y" direction or "−Y" direction in accordance with the input signal.

The intensity of the input signal which is required to orient the magnetization vector is dependent on where the input coil 24 is placed on the magnetic film 11 and whether recirculation of the output signal is desired. When the domains are being formed at edge 30 in FIG. 2a, the magnetization vectors of the domains can randomly rotate into the "±Y" direction as the magnetic film 11 is acted upon by a tensile stress. Since the input coli 24, in FIG. 2a, is also placed at edge 30, a very small input signal is needed to rotate the magnetization vectors into the desired direction. If a recirculating coil, such as recirculating coil 25 in FIG. 1, is placed at edge 30, the input coil 24, if it is to write over the recirculated output data, will have to be energized sufficiently to reverse the direction of any magnetization vectors oriented oppositely to the field generated by input coil 24. If the input and recirculating coils are coupled, as in FIG. 2b, the input signal will have to be greater than the signal recirculated from the reading coil 26.

In FIG. 1, the data is read out by placing a reading coil 26 at the output end of the magnetic film 11; because of the change in the direction of the magnetic flux as the domains pass under the reading coil 26 toward edge 31, a voltage is generated across leads 18 and detected by sensing device 23. As the reading coil 26 may be placed at any desired position (or there may be a series of such coils), the delay line is variably tappable. In lieu of a fixed coil, a movable reading coil 26', connected through leads 18', may be preferred for continuous adjustment of the output position. In addition the data may be recirculated by leads 17, coupling means 27, and recirculating coil 25; the coupling means 27 in the recirculating loop may be a passive network as only a minute field is required to determine the sense of the domains formed at edge 30 of the magnetic film 11. The entire structure should be housed in a suitable enclosure to protect it from stray electric and/or magnetic fields.

It is obvious from the nature of the invention that the data should be placed into the magnetic film 11 with the proper frequency and phase relationship with respect to the acoustic waves. To accomplish this, means can easily be provided to synchronize the output of the signal generator 22 with the driving voltage ($V_0 \sin wt$) of the transducer 14 to insure that the input data is applied during the periods of tensile stress.

Since the data to be recirculated is already of the proper frequency, a variable delay line could be inserted in coupling means 27 to obtain proper phase relationship with the driving voltage.

In FIG. 2a, magnetic films 11a and 11b are placed parallel to one another on the surface of an acoustic transmission medium 10. The width of magnetic film 11a increases from edge 30 to edge 31 while the thickness of magnetic film 11b increases along the same dimension. The larger width or thickness at edge 31 gives rise to a gain in the output signal of each magnetic film; this gain in output signal is useful to compensate for any signal losses occurred in the magnetic films or to provide a sufficiently large signal for recirculation or to activate other devices. In addition, when data is inserted into media 11a and 11b, it is synchronously propagated along the delay line from edge 30 to edge 31. Thus all phase relationships at the input end will be retained at the output end.

In FIG. 2b, signal gain is obtained by affixing an acoustic transmission medium 10' which has a considerably higher acuostic wave propagation velocity therein to the output end of acoustic transmission medium 10. If serious mismatch can be avoided, the increased rate of switching of the magnetic film 11 at the reading coil 26 results in an increased signal output.

In FIG. 3, the use of magneto-optic techniques for reading out data is schematically illustrated. A source of electromagnetic radiation 35 emits a beam 40 which is collimated by a slit system 36 and focused by a lens 37 through a polarizer 38 and onto the magnetic film 11 at an angle less than 90°. The polarized line beam 40a is reflected by the magnetic film 11, thereupon becoming beam 40b, and passes through an analyzer 39. The polarized line beam, now beam 40c, finally falls upon a photocell 41. Since the rotation given to the angle of polarization of beam 40a by reflection from the magnetic film 11 is proportional to $\cos \gamma$ (where $\gamma$ is the angle between the direction of propagation of beam 40a and the magnetization vectors of the magnetic film 11), no such rotation is given by the reflection from the regions of compression 20', while a positive or negative rotation is given by reflection from the regions of tension 21'. The analyzer 39 is adapted to pass the beam 40b at different levels of intensity, depending on the angle of polarization of the radiation comprising beam 40b; the photocell 41 then senses the fluctuations in the beam 40c. Although the use of the Kerr effect has been herein illustrated, the Faraday magneto-optic effect can be used equally as well if media 10 and 11 are sufficiently transparent to the impinging radiation.

If the magnetic film is neither isotropic nor has an easy direction of magnetization parallel or perpendicular to the direction of stress, the magnetization vectors will not spontaneously rotate 90° when A becomes greater than K but will rotate some lesser angle depending on the magnitude of A and the phase difference between $E_m$ and $E_\sigma$. In such a case, the magnetization vectors will be neither parallel nor perpendicular to the direction of stress, the signal field to orient the magnetization vectors will have to be larger, and coupling means 27 in the recirculation loop may have to contain active amplifying elements.

The invention, then, provides a variably tappable digital delay line which requires low signal power and low, narrow band, CW drive power. The magnetic film does not have to have an easy direction of magnetization and no aligning fields are required; in addition, the acoustic transmission medium may be made very thin, since only a small fraction of the acoustic energy is needed at the surface for influencing the magnetic film. Since the device has little distortion (as signal energy is not converted to acoustic energy) and no dispersion, data may be propagated at a high density with one bit of information stored for each wavelength of the acoustic wave. In addition, gain may be provided by the device itself and passive recirculation of data for storage purposes is available.

Having thus described the invention, it will be apparent that numerous modifications and departures, as explained above, may now be made by those skilled in the art and which fall within the scope of the invention. Consequently the invention herein disclosed is to be construed as limited only by the spirit and scope of the appended claims.

What is claimed is:

1. A digital delay line comprising a magnetic medium, transducing means for propagating compression and tension waves along the length thereof to establish a sequence of magnetic domains propagating along with said waves, writing means at the input end of said magnetic medium for controlling the direction of the magnetization vectors of alternate ones of said magnetic domains to place data in said digital delay line, and reading means for sensing the direction of the magnetization vectors of said alternate magnetic domains at one or more preselected positions along the length of said magnetic medium.

2. The apparatus of claim 1 wherein said reading means includes means for sensing the direction of said magnetization vectors magneto-optically.

3. The apparatus of claim 1 and in addition means for recirculating said data.

4. Digital delay line comprising an acoustic transmission medium, a magnetic medium adhering to one surface of said acoustic transmission medium, means for generating an acoustic wave in said acoustic transmission medium to create a sequence of magnetic domains in said magnetic medium having mutually perpendicular magnetization vectors, said domains propagating with said acoustic wave and alternate ones of said domains having magnetization vectors parallel to the direction of propagation of said acoustic wave, means for absorbing said acoustic wave at the end of said acoustic transmission medium, writing means for controlling the direction of said parallel magnetization vectors to lie along or opposite to said direction of propagation in accordance with the digital data to be placed in said delay line, and reading means for sensing the direction of said magnetization vectors parallel to said direction of propagation at one or more preselected positions along the length of said magnetic medium and to generate an output signal representative of said digital data.

5. The apparatus of claim 4 and in addition means for amplifying said output signal, said means including a second acoustic transmission medium affixed to the output end of said digital delay line and having a substantially higher acoustic wave propagation velocity therein.

6. Digital delay line comprising an acoustic transmission medium; a plurality of parallel magnetic films adhering to one surface of said acoustic transmission medium; a transducer bonded to the input end of said acoustic transmission medium, said transducer including a piezo-electric crystal and a pair of transducer electrodes; means for activating said transducer to generate an acoustic wave in said acoustic transmission medium to create and propagate a sequence of magnetic domains in said magnetic films; a matched absorber bonded to the end of said acoustic transmission medium; a plurality of writing coils adapted to control the direction of the magnetization vectors in said magnetic domains; means for activating said writing coils in accordance with the data to be placed in said delay line; a plurality of reading coils adapted to sense the direction of said magnetization vectors at a preselected position along the length of each said magnetic film and to generate a output signal corresponding thereto; and means for detecting the output signals of said reading coils, said output signals being representative of the data propagated in said delay line.

7. The apparatus of claim 6 and in addition means for recirculating said output signals, said means consisting solely of passive elements.

8. The apparatus of claim 6 wherein the cross-sectional area of the output ends of said magnetic films is greater than the cross-sectional area of the input ends of said magnetic films.

References Cited by the Examiner
UNITED STATES PATENTS

| | | | |
|---|---|---|---|
| 2,921,989 | 1/60 | Serrell | 179—100.2 |
| 3,129,412 | 4/64 | Lovell | 340—174 |
| 3,138,789 | 6/64 | Pugh | 340—174 |
| 3,145,372 | 8/64 | Suits et al. | 340—174 |

OTHER REFERENCES

Publication I, "Recording in the Volume of Ferrite by Ultrasonic Stress Scanning," by Jan A. Rajchman, RCA Technical Notes RCA TN No. 346; November, 1959.

IRVING L. SRAGOW, *Primary Examiner.*